Sept. 25, 1923.
C. G. BUTLER
1,468,656
LUBRICATING SHACKLE BOLT
Filed March 1, 1922
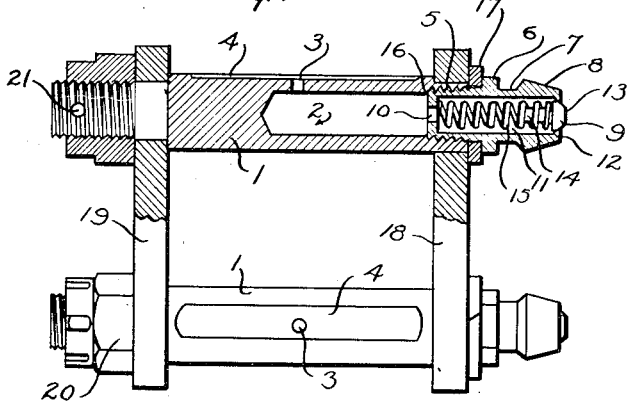
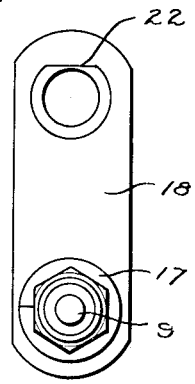
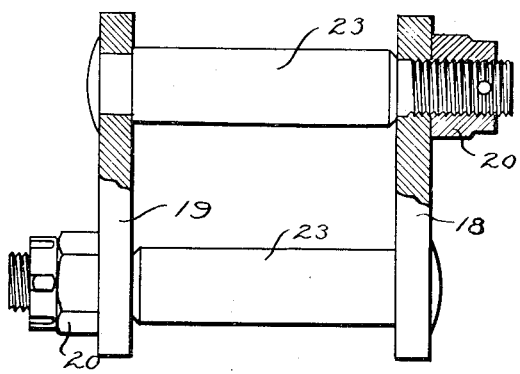
Inventor
Clyde G. Butler,
By Toulmin & Toulmin
Attorney Patented Sept. 25, 1923.

1,468,656

UNITED STATES PATENT OFFICE.

CLYDE G. BUTLER, OF DAYTON, OHIO.

LUBRICATING SHACKLE BOLT.

Application filed March 1, 1922. Serial No. 540,344.

*To all whom it may concern:*

Be it known that I, CLYDE G. BUTLER, a citizen of the United States, residing at Dayton, in the county of Montgomery and State of Ohio, have invented certain new and useful Improvements in Lubricating Shackle Bolts, of which the following is a specification, reference being had therein to the accompanying drawing.

My invention relates to a lubricating means and in particular to a lubricating shackle bolt.

It is an object of my invention to provide means for lubricating a shackle bolt, particularly of a Ford car. It is my object to provide means of lubricating a shackle bolt from a self-contained reservoir of lubricant and means of filling said reservoir.

It is a further object of my invention to provide an assembly of links and shackle bolts for an automotive vehicle and in particular for a Ford car which will permit of the lubrication of the shackle bolts and in particular the lubrication from the outside of the car.

It is a further object to provide an assembly of shackles and bolts of the self-lubricating type of my invention which may be readily installed for the existing bolts and shackles on an existing Ford car to eliminate the present disadvantages of the present shackle bolts and shackles which do not provide for any means of satisfactory lubrication.

Referring to the drawings:

Fig. 1 is an elevation, partially in section, of bolts and shackles assembled;

Fig. 2 is an elevation partially in section of the standard form of Ford shackle and bolts for which my combination is to be substituted;

Fig. 3 is an end elevation of Fig. 1, looking at Fig. 1 from the right hand side with the upper lubricating valve removed.

Referring to the drawings in detail, 1 is a shackle bolt having a reservoir 2 therein and exit passageway 3 and a lubricating groove 4 in the surface of the bolt 1. At one end of the reservoir is threaded a valve member 5 having a shoulder 6 thereon, a throat 7 and a tapered head 8 with an aperture 9 in one end thereof and an entrance passageway 10 at the other end thereof. A chamber 11 is within this member. At the outer end is a conical seat 12 in which fits a conical valve plug 13 having a shaft 14 which is surrounded by a spring 15 that abuts against the back of 13 at one end and against the end 16 at the other end of a valve member. A washer 17 is interposed between the valve member and in particular the shoulder 6 thereof and the link 18. On the other end of the bolt is a companion link 19. In the assembly shown there are a pair of links and a pair of bolts but it will be understood that such links and such bolts may be used either singly or in combination.

It will be noted that both lubricant valves are placed on the same side at the outside for ready access by the operator and that the bolts have mounted on their inner ends the castellated nuts 20 and are retained in position by a customary cotter pin passing through the hole 21 in the bolt. The bolt is kept from turning by having one portion of one end suitably flattened as at 22 in Fig. 3.

In the standard Ford installation, shown in Fig. 2, there will be seen the same shackles 19 with solid bolts 23 having the nuts 20 on opposite sides. There is no means of lubricating this bolt save by external lubrication which it is almost impossible to introduce between the bolt and the spring which it supports.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

The combination with a pair of spaced spring shackles having openings adjacent each end, the openings in one shackle being alined with the openings in the other; of a spring shackle bolt having a body portion provided with a chamber for oil therein open at one end and threaded interiorly, said bolt having each end exteriorly reduced to fit in the respective openings of a respective shackle, said reduced ends providing shoulders holding said shackles in spaced relation, the reduced end remote from the open end of the chamber being threaded and provided with a nut to bear against the exterior of one of the shackles, the remaining reduced end being of substantially even thickness with the shackle through which it passes, a combined bolt retaining and valve member screwed into the open end of the chamber of said bolt, said bolt retaining member having its inner end threaded for the purpose aforesaid and provided at the extremity of the threaded portion with a collar forming a nut, a washer located beneath said collar and bearing against the respective shackle, said bolt retaining member having an opening extending therethrough, and a normally closed spring pressed valve carried by the bolt retaining member and providing means for the admission of oil to the chamber of the bolt.

In testimony whereof, I affix my signature.

CLYDE G. BUTLER.